United States Patent
Yamada et al.

(10) Patent No.: US 9,112,994 B2
(45) Date of Patent: Aug. 18, 2015

(54) MOBILE TERMINAL AND PROGRAM

(75) Inventors: Eiju Yamada, Yokohama (JP); Kazuhiro Yamada, Yokohama (JP); Dai Kamiya, Tokyo (JP); Yasushi Onda, Tokyo (JP); Izua Kano, Yokohama (JP); Keiichi Murakami, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 961 days.

(21) Appl. No.: 12/670,135

(22) PCT Filed: Jul. 24, 2008

(86) PCT No.: PCT/JP2008/063270
§ 371 (c)(1),
(2), (4) Date: Jun. 4, 2010

(87) PCT Pub. No.: WO2009/014171
PCT Pub. Date: Jan. 29, 2009

(65) Prior Publication Data
US 2010/0285786 A1   Nov. 11, 2010

(30) Foreign Application Priority Data

Jul. 24, 2007   (JP) ................................ 2007-192409

(51) Int. Cl.
*H04W 4/00* (2009.01)
*H04M 1/725* (2006.01)
(Continued)

(52) U.S. Cl.
CPC ......... *H04M 1/72583* (2013.01); *G06F 3/0482* (2013.01); *H04M 1/72569* (2013.01); *H04M 1/274583* (2013.01); *H04M 1/7253* (2013.01); *H04M 1/72572* (2013.01); *H04M 2250/10* (2013.01)

(58) Field of Classification Search
USPC ............ 455/41.2, 414.1, 422.1, 435.1, 435.2, 455/466
See application file for complete search history.

(56) References Cited

U.S. PATENT DOCUMENTS 7,340,438 B2 *   3/2008   Nordman et al. ............... 705/64
2002/0010008 A1 *   1/2002   Bork et al. ..................... 455/567
(Continued)

FOREIGN PATENT DOCUMENTS

JP   2004102609 A   4/2004
JP   2004112392 A   4/2004
(Continued)

OTHER PUBLICATIONS

European Patent Application No. 08791522.9; Supplementary European Search Report dated Jul. 12, 2011.
(Continued)

*Primary Examiner* — Patrick Edouard
*Assistant Examiner* — Matthew Genack
(74) *Attorney, Agent, or Firm* — MKG LLC

(57) ABSTRACT

The environment around mobile phone handset 10 is judged according to the number of other mobile phone handsets present near mobile phone handset 10 and the registration status of the nearby telephones. Then, the display sequence of function names on a function selection screen is changed according to the environment. As a result, functions deemed likely to be selected by the user based on the environment surrounding mobile phone handset 10 may be displayed at positions where they may be selected with fewer operations. In this way, the number of operations required of the user for selecting any of multiple functions may be reduced.

13 Claims, 6 Drawing Sheets

| STATUS OF PROXIMATE MOBILE PHONES | ENVIRONMENT CLASS |
|---|---|
| NO PROXIMATE MOBILE PHONES | 1 |
| 1-5 UNREGISTERED PROXIMATE MOBILE PHONES | 2 |
| 6 OR MORE UNREGISTERED PROXIMATE MOBILE PHONES | 3 |
| 1-5 REGISTERED PROXIMATE MOBILE PHONES | 4 |
| 6-15 REGISTERED PROXIMATE MOBILE PHONES | 5 |
| 16 OR MORE REGISTERED PROXIMATE MOBILE PHONES | 3 |

162

(51) Int. Cl.
*G06F 3/0482* (2013.01)
*H04M 1/2745* (2006.01)

(56) References Cited

U.S. PATENT DOCUMENTS

| | | | |
|---|---|---|---|
| 2005/0160261 A1* | 7/2005 | Barry et al. | 713/164 |
| 2005/0170845 A1 | 8/2005 | Moran | |
| 2006/0161871 A1* | 7/2006 | Hotelling et al. | 715/863 |
| 2006/0224938 A1* | 10/2006 | Fikes et al. | 715/500 |
| 2008/0022322 A1* | 1/2008 | Grannan et al. | 725/78 |

FOREIGN PATENT DOCUMENTS

| | | |
|---|---|---|
| JP | 200527138 A | 1/2005 |
| JP | 2007135009 A | 5/2007 |
| WO | 02/102035 A2 | 12/2002 |
| WO | 2006/070253 A2 | 7/2006 |
| WO | 2006114996 A1 | 11/2006 |

OTHER PUBLICATIONS

PCT International Search Report; International Application No. PCT/JP2008/063270; Date Mailed Oct. 28, 2008.

Examination Report dated Feb. 21, 2012; issued in conjunction with European Patent Application No. 08791522.9.

2nd Notification of Office Action issued in Chinese Patent Application No. 200880100125.4 issued on Oct. 9, 2012.

* cited by examiner

FIG. 3

| IDENTIFICATION INFORMATION | DATE OF REGISTRATION |
|---|---|
| jkjierakj12s9 | 2006/4/1 |
| 554sjkuiijkskg | 2006/4/1 |
| 5stjijig84554 | 2006/5/6 |
| 58irkjksareilo | 2006/5/25 |
| plsoierkl45sao | 2006/6/8 |
| ..... | ..... |
| ..... | ..... |

| STATUS OF PROXIMATE MOBILE PHONES | ENVIRONMENT CLASS |
|---|---|
| NO PROXIMATE MOBILE PHONES | 1 |
| 1-5 UNREGISTERED PROXIMATE MOBILE PHONES | 2 |
| 6 OR MORE UNREGISTERED PROXIMATE MOBILE PHONES | 3 |
| 1-5 REGISTERED PROXIMATE MOBILE PHONES | 4 |
| 6-15 REGISTERED PROXIMATE MOBILE PHONES | 5 |
| 16 OR MORE REGISTERED PROXIMATE MOBILE PHONES | 3 |

162

| FUNCTION NAME | ENVIRONMENT CLASS |
|---|---|
| E-MAIL | 1 |
| SCHEDULER | |
| ..... | |
| BUSINESS CARD EXCHANGE | 2 |
| SMALL PAYMENT | |
| ..... | |
| RINGTONE VOLUME CONFIGURATION | 3 |
| SILENT MODE | |
| ..... | |
| INFORMATION SYNCHRONIZATION | 4 |
| CONTENT EXCHANGE | |
| ..... | |
| ADVERSARIAL GAME | 5 |
| MULTIPLAYER GAME | |
| ..... | |

163

| IDENTIFICATION INFORMATION | REGISTRATION STATUS | NUMBER OF REGISTERED PROXIMATE MOBILE PHONES | NUMBER OF UNREGISTERED PROXIMATE MOBILE PHONES |
|---|---|---|---|
| ghu12sarekid | UNREGISTERED | 3 | 1 |
| jkjierakj12s9 | REGISTERED | | |
| 554sjkuiijkskg | REGISTERED | | |
| 5stjijig84554 | REGISTERED | | |

MOBILE TERMINAL AND PROGRAM

FIELD OF THE INVENTION

The present invention relates to technology for enabling a user to select any of multiple functions implemented by a mobile terminal.

BACKGROUND

Mobile phone handsets, which have become widely used in recent years, are provided with various functions. Examples of basic functions include functions for adjusting a ringtone volume when a call is received. More complicated functions include functions for exchanging electronic business-card data between multiple mobile phone handsets or purchasing goods using electronic money stored in a mobile phone handset. When a user selects a desired function from among these multiple functions, first, a function selection screen listing the function names is displayed on the mobile phone handset, after which a desired function is selected from the function selection screen.

It is desirable that in selecting a desired function the user is required to perform as few selection operations as possible; and it is therefore important in arranging the function names on a screen to take such usability into account. For example, when the function names are displayed on the function selection screen, if one or more of the function names that is likely to be selected by the user can be arranged at a default position at which the cursor for selecting a function is displayed (typically at the top of the function selection screen), such positioning is likely to reduce or eliminate a need for the user to move the cursor to select the one or more commonly selected function names. With this object in mind, Patent Document 1 JP-A-2004-102609 discloses a technology that records a frequency of use of each of a function and sets a display so that functions that are most frequently used may be selected by use of relatively few operations.

However, it is not possible to predict which function the user will select in each and every situation based solely on past use frequency.

SUMMARY

According to one aspect, the present invention resides in a mobile terminal (a "first" mobile terminal) that includes: a display control unit that displays, on a display, a function selection screen on which a plurality of function names are arranged in accordance with a given sequence. The first mobile terminal also includes a selection operation unit that accepts an operation for selecting any of the function names arranged on the function selection screen; an implementation unit that implements the function with the name selected through the operation accepted by the selection operation unit; and a detection unit that detects another mobile terminal present within a given distance from a position of the first mobile terminal. There is also a determination unit that determines different sequences to be complied with by the display control unit for a case in which other mobile terminals are detected by the detection unit, and for a case in which other mobile terminals are not detected by the detection unit.

According to an aspect of the present invention, when another mobile terminals are detected by the detection unit, the function names are displayed in an appropriate sequence, and as a result, a number of operations required to be carried out by the user in selecting a desired one of any of multiple functions can be reduced.

In an exemplary mode of the present invention, the detection unit determines a number of other mobile terminals present within the given distance from the position of the mobile terminal; and the determination unit determines the sequence depending on the number of other mobile terminals determined by the detection unit. Another exemplary mode further includes an identification information memory that stores identification information assigned to the detected other mobile terminals, other than the mobile terminal, wherein: the detection unit determines the identification information assigned to the detected other mobile terminals present within the given distance from the position of the mobile terminal; and the determination unit determines the sequence differently for a case in which the identification information determined by the detection unit matches the information stored in the identification information memory, and a case in which the identification information determined by the detection unit does not match the information stored in the identification information memory.

As a result, the function names are displayed in a sequence appropriate for the situation in accordance with the number of other mobile phone handsets determined and whether information of the detected other mobile phone handsets has already been stored.

Typically, the determination unit includes: an environment definition memory that stores information detected by the detection unit and an environment class assigned to each of a plurality of environments defined in advance as environments of the mobile terminal; a function memory that stores function identification information assigned to each of the functions and the environment classes; an environment specification unit that specifies the environment class that is associated with the information detected by the detection unit and stored in the environment definition memory; and a function specification unit that specifies function identification information that is associated with the environment class specified by the environment specification unit and stored in the function memory, and determines the sequence to arrange the function name assigned to the function identification information specified by the function specification unit at a position where the function name is selectable by use of fewer operation selection steps than are required to be used for selection of other of the function names.

In this case, if the environment specification unit specifies a plurality of environment classes, the determination unit specifies an order of precedence for each of the plurality of environment classes according to a weighting assigned to each of the plurality of environment classes, and determines the sequence according to the specified order of precedence.

With this configuration, even when multiple environments are specified, the function names can be displayed in an appropriate sequence.

Moreover, the exemplary mode may include: a modification operation unit that accepts operations for modifying the sequence determined by the determination unit; and a modified-content memory that stores content modified through the operations accepted by the modification operation unit, wherein the determination unit determines the sequence according to the content stored in the modified-content memory.

As a result, the display sequence may be set according to the user's intentions.

The exemplary mode of the present invention includes: an acquisition unit that acquires a program describing the steps for implementing the function using the implementation unit along with the content stored in the environment definition memory or the function memory; and an update unit that updates the content stored in the environment definition memory or the function memory according to the content described in the program acquired by the acquisition unit.

In this way, the content stored in the environment definition memory or the function memory may be updated according to the intentions of the program provider.

Moreover, another exemplary mode of the present invention includes a reception unit that, when function identification information assigned to the function is transmitted from another mobile terminal detected by the detection unit, receives the function identification information, wherein the determination unit determines the sequence to arrange the function name to which the function identification information received by the reception unit has been assigned at a position where the function name is selectable by use of fewer operation selection steps than are required to be used for selection of other of the function names.

In this way, the function name of the function identification information transmitted from another mobile terminal present within a given distance from the position of the mobile terminal can be arranged at a position such that the function of the function name is selectable by the user by use of relatively few selection operations.

Moreover, the exemplary mode may also be set to include a user identification unit that identifies a user using the mobile terminal, wherein the determination unit determines the sequence for the user identified by the user identification unit. As a result, the display sequence of the function names can be changed for each user. Moreover, the exemplary mode may also be set to include an area specification unit that specifies an area in which the mobile terminal is located, wherein the determination unit determines the sequence for each area specified by the area specification unit. As a result, the display sequence of the function names can be changed for each area.

In another aspect, the present invention resides in an electronic storage medium containing a program to cause a computer to operate a display control unit that displays a function selection screen on which a plurality of function names are arranged in accordance with a given sequence, and that is used to select any of a plurality of function names; a detection unit that detects another mobile terminal present within a given distance from the position of the computer; and a determination unit that determines different sequences to be complied with by the display control unit for a case in which other mobile terminals are detected by the detection unit, and for a case in which other mobile terminals are not detected by the detection unit. According to an aspect of the present invention, when another mobile terminal is detected by the detection unit, the function names are displayed in a sequence appropriate to the situation, and as a result, a number of operations required to be carried out by the user for selecting a function may be reduced.

BRIEF DESCRIPTION OF THE DRAWINGS

FIG. 3 is a diagram showing one example of the content of a telephone registration table stored by the mobile phone handset;

FIG. 4 is a diagram showing one example of the content of a table of environment definitions stored by the mobile phone handset;

DETAILED DESCRIPTION

Figure 1:
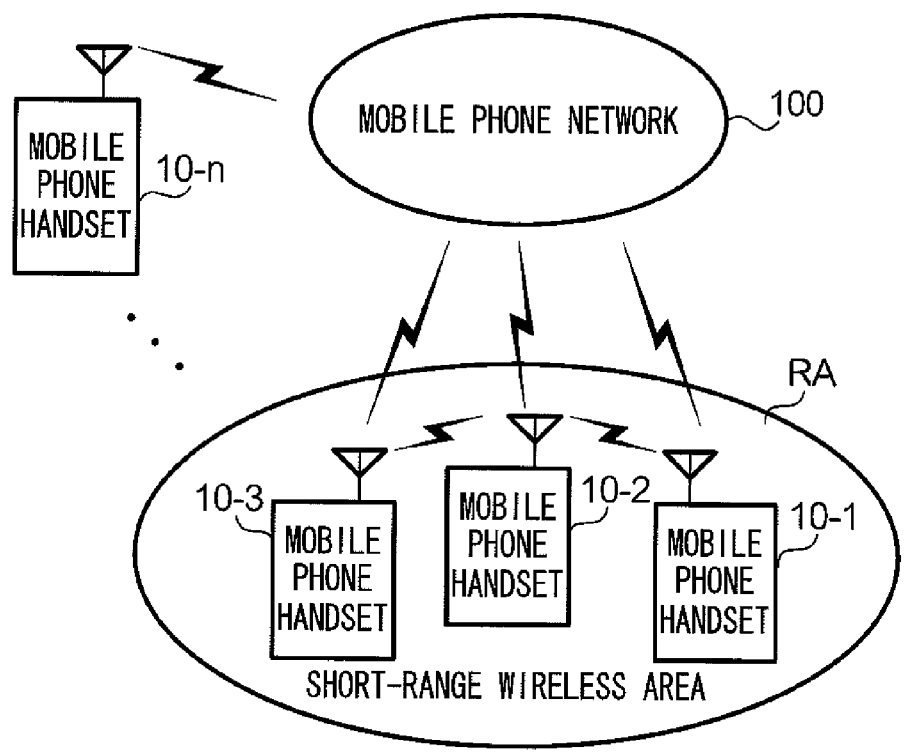
FIG. 1 is a block diagram showing the overall configuration of a system related to an exemplary embodiment of the present invention.

In the embodiment, an environment in which a mobile phone handset is situated is evaluated and a determination is made as to a function of the handset that will likely be desired to be used by the user in view of the environment in which the phone is currently situated. Accordingly, the function name of the function that is likely desired to be used is displayed on a function selection screen at a position in which it can be selected by the user by carrying out relatively few selection operations. Specifically, a display sequence of the function names is changed depending on whether other mobile phone handsets are present near the user's mobile phone handset. Other mobile phone handsets that are present near the user's mobile phone handset (i.e., within a given distance from the position of the user's mobile phone handset) are hereinafter referred to as "proximate mobile phones." Moreover, the term "display sequence" as used in this description refers to a display sequence that affects a number of operations required to be carried out by the user in selecting a function. For example, for a function selection screen in which a cursor is moved sequentially over a list of multiple function names to make a selection, the position within the function selection screen at which the cursor is first displayed is the uppermost display sequence, and the position requiring the greatest moving distance of the cursor from the first position is the lowermost display sequence. Moreover, when multiple function names are arranged on multiple function selection screens in fixed numbers and a desired function is selected by switching between the function selection screens, the function selection screen displayed first is the uppermost display sequence, and the function selection screen displayed last is the lowermost display sequence. In other words, the position requiring the lowest number of operations for selecting a function constitutes the uppermost display sequence and the position requiring the highest number of operations constitutes the lowermost display sequence.

Moreover, in the present exemplary embodiment, the display sequence of the function names is changed according to a number of proximate mobile phones. In addition, proximate mobile phones are divided into two types: those that have been registered in the user's mobile phone handset (the mobile phone handset displaying the function selection screen) and those that have not been registered in the user's mobile phone set. Registration status is another factor that is taken into account in changing the display sequence of the function names.

The following are examples of display sequences that are set in accordance with a specific surrounding environment.

When there are no proximate mobile phones, the user of a first mobile phone handset is separated from other people and is alone. Consequently, on the function selection screen, function names for handling private information, such as E-mail or a scheduler, are prioritized and displayed. This "prioritized display" refers to displaying a function name at a position requiring fewer operations of the user for selection as described above.

When there are only 1-5 unregistered proximate mobile phones, the user may exchange business cards with strangers or the user may be standing before a cash register for making a payment at a store. Therefore, on the function selection screen, a business-card-exchange function or a small-payment function is prioritized and displayed When there are 6 or more unregistered proximate mobile phones or 16 or more registered proximate mobile phones, this type of environment suggests that the user is in a public area. Consequently, on the function selection screen, functions appropriate for public areas, such as functions for adjusting the ringtone volume, are prioritized and displayed.

When there are only 1-5 registered proximate mobile phones, there is a highly possibility that the user is engaged in some type of cooperative activity with acquaintances. Consequently, functions for synchronizing shared information or for exchanging information, for example, are prioritized and displayed.

When there are 6-15 registered nearby telephones or proximate mobile phones, there is a high possibility that a large group of acquaintances will engage in a competitive game. Consequently, on the function selection screen, relevant game functions are prioritized and displayed.

FIG. 1 is a block diagram showing the overall configuration of a system related to the one exemplary embodiment. In FIG. 1, the mobile phone network 100 is a communications network utilizing the PDC (Personal Digital Cellular) standard, the GSM (Global System for Mobile Communications) standard, or the IMT-2000 (International Mobile Telecommunication-2000) standard. The mobile phone handsets 10-1, 10-2, 10-3 to 10-n are each capable of implementing communications over an extremely wide range through mobile phone network 100. Moreover, the mobile phone handsets 10-1, 10-2, 10-3 to 10-n can also implement wireless communication within a limited range with a radius of 10 m, for example, without utilizing the mobile phone network 100. The former will be referred to as "wide-area communication" and the latter will be referred to as "short-range communication." Wide-area communication includes, for example, telephone calls, E-mail, or the downloading and uploading of information and is used when implementing network functions. Short-range communication includes, for example, exchanging business cards and electronic money as well as synchronizing and exchanging information with other mobile phone handsets, and is used when implementing non-network local functions. ¥

FIG. 1 illustrates an area (short-range wireless area) RA, where the mobile phone handset 10-2 is able to implement short-range communication. Mobile phone handsets present in the short-range area RA are "proximate mobile phones" of mobile phone handset 10-2. In FIG. 1, the mobile phone handsets 10-1, 10-3 are proximate mobile phones of the mobile phone handset 10-2. As the mobile phone handsets 10-1, 10-2, 10-3 to 10-n all have the same configurations and perform the same operations, in the following description, when there is no need to distinguish one handset from another, they will be collectively referred to as "mobile phone handset 10."

Figure 2:
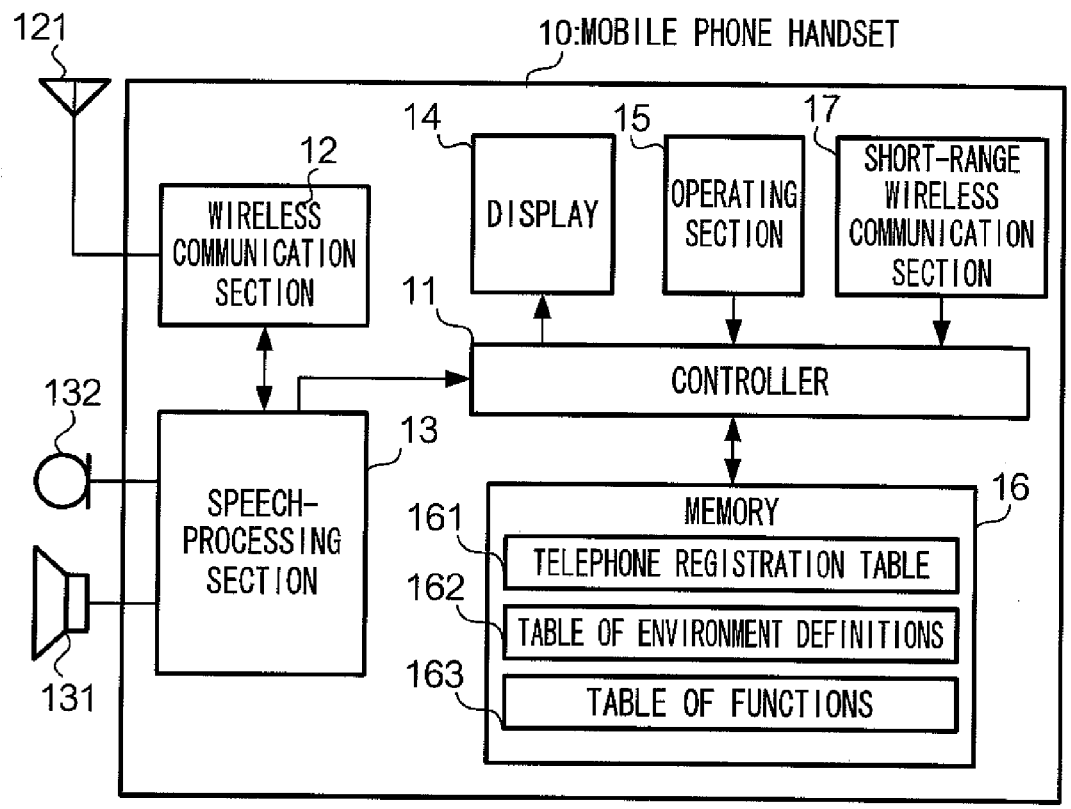
FIG. 2 is a block diagram showing the configuration of a mobile phone handset of the exemplary embodiment.

FIG. 2 is a block diagram showing the configuration of one embodiment of a mobile phone handset 10. As shown in FIG. 2, the mobile phone handset 10 includes a controller 11, a wireless communication section 12, a speech-processing section 13, a display 14, an operating section 15, a memory 16, and a short-range wireless communication section 17. The controller 11 includes, for example, a CPU (Central Processing Unit), a ROM (Read Only Memory), and a RAM (Random Access Memory) and controls each section of mobile phone handset 10. The ROM stores basic control programs (preinstalled programs to be described later) executed by the CPU.

The wireless communication section 12 includes an antenna 121 and a wireless communication circuit that is not shown. When the wireless communication section 21 receives a radio signal transmitted from a base station of the mobile phone network 100 through antenna 121, it demodulates the signal using the wireless communication circuit and performs error correction and decoding processes. The error-corrected and decoded audio data undergoes D/A conversion and amplification at the speech-processing section 13, after which it is transmitted from speaker 131 as received voice audio. On the other hand, the transmitted voice audio of the user is collected by the microphone 132 and converted into a transmission signal, after which it is undergoes amplification and A/D conversion at the speech-processing section 13 and is converted into digital data. Then, after undergoing modulation and frequency conversion, it is transmitted as a radio signal from the wireless communication section through the antenna 121.

The display 4 includes, for example, a liquid crystal display and a liquid crystal drive circuit and displays various information, user-interactive screens (e.g., a function selection screen), or the like according to instructions from controller 11. The operating section 15 includes, for example, a numeric keypad from "0" to "9," an on-hook key and an off-hook key, and keys for moving a cursor on the display screen and delivers signals according to user operations to the controller 11. Based on these signals, the controller 11 determines the details of the instructions provided through the user operations and executes processes according to the results of the determination.

The short-range wireless communication section 17 includes an antenna and a radio control circuit (both not shown) and implements wireless communication with any other mobile phone handset 10 (proximate mobile phone) that is present within the short-range wireless area. Any communication system may be used for the short-range wireless communication section 17, and examples include systems compatible with the Bluetooth (registered trademark) specification and general-purpose infrared data communication systems. When these systems are used, the short-range wireless area covers a range with a radius of up to around 10 meters. The controller 11 uses the short-range wireless communication section 17 to detect the presence of proximate mobile phones.

The memory 16 is, for example, an EEPROM (Electrically Erasable and Programmable Read Only Memory) or a flash memory. The memory 16 stores programs that describe procedures for processes executed by the controller 11. For example, the memory 16 stores application programs for implementing various functions, such as exchanging business cards, adjusting ringtone volume, exchanging information, and playing games as described above. Moreover, the memory 16 also stores a display control program for listing these functions names and allowing the user to select any of these functions. Moreover, the memory 16 stores identification information assigned to the mobile phone handset 10. This identification information may be a suitable predefined character string or a telephone number or E-mail address, but in the present exemplary embodiment, a predefined character string is used.

Moreover, the memory 16 stores a telephone registration table 161, a table of environment definitions 162, and a table of functions 163. The contents of these tables will now be described.

FIG. 3 is a diagram showing one embodiment of the content described in telephone registration table 161. As shown in FIG. 3, the telephone registration table 161 matches and describes identification information of the mobile phone handset 10 with the date when the identification information was described in the telephone registration table 161 (date of registration). The user of a mobile phone handset 10 that stores the telephone registration table 161 and the user of another mobile phone handset 10 corresponding to identification information registered in the telephone registration table 161 are mutual acquaintances. These users each operate their respective mobile phone handsets 10, exchange the identification information of their respective mobile phone handsets 10 using a wireless communication function of the short-range wireless communication section 17, and register one another's identification information in the telephone registration table 161. Moreover, one of the users may ask for the identification information of the other user's mobile phone handset 10 and manually input the information using operation section 15 to register the identification information in the telephone registration table 161.

Figures 5, 6:
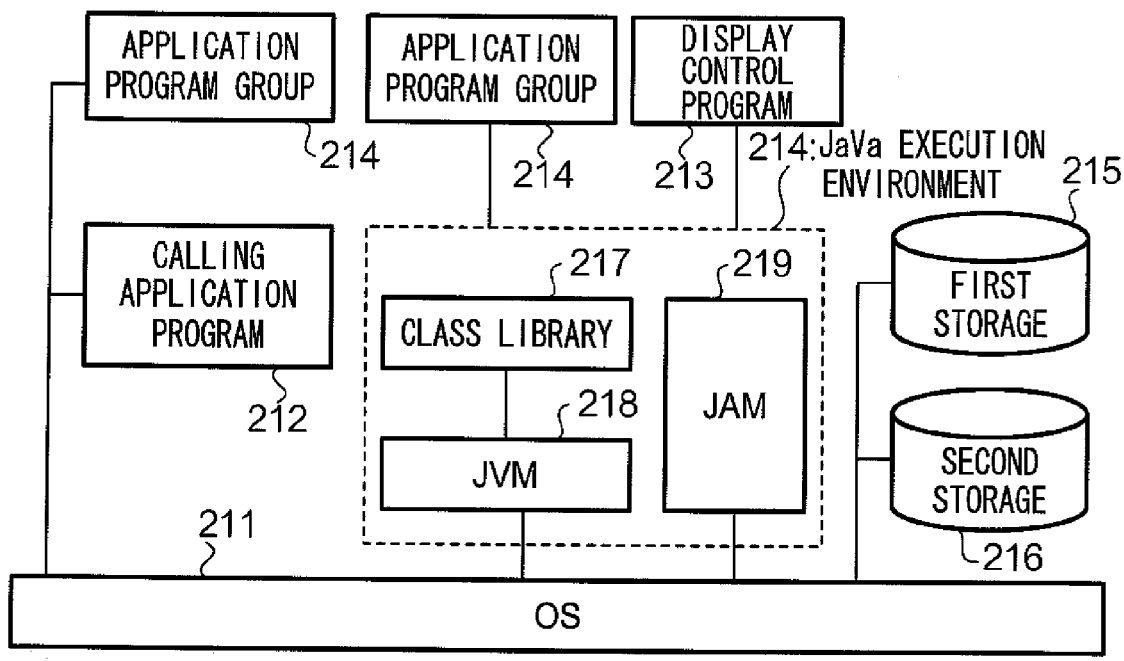
FIG. 5 is a diagram showing one example of the content of a table of functions stored by the mobile phone handset.
FIG. 6 is a diagram showing a software configuration of the mobile phone handset.

FIG. 4 is a diagram showing the content of the embodiment of a table of environment definitions 162 and FIG. 5 is a diagram showing one example of the content of one embodiment of a table of functions 163. The table of environment definitions 162 defines the environment around the mobile phone handset 10 based on the number and the registration status of proximate mobile phones. As shown in FIG. 4, in the table of environment definitions 162, the detected details of proximate mobile phones are matched with environment classes assigned to each environment. The table of functions 163 defines the environments in which each function name should be prioritized and displayed. As shown in FIG. 5, in the table of functions 163, function identification information (function names in this exemplary embodiment) assigned to each function is matched with an environment class.

First, the detail table of environment definitions 162 includes five types of environments.

The first environment (environment class "1") is one in which there are no proximate mobile phones. In other words, the user of a mobile phone handset 10 is in a location that is apart from other people and is therefore isolated. Therefore, as shown in FIG. 5, functions for handling private information, such as e-mail or a scheduler, are matched with environment class "1."

The second environment (environment class "2") is one in which there are 1-5 unregistered proximate mobile phones. In other words, there are relatively few (1-5) strangers near the user of the mobile phone handset 10. In this type of environment, strangers often exchange business cards. Moreover, this type of environment is also encountered when waiting before a cash register to make a payment at a store. Therefore, as shown in FIG. 5, business-card-exchange functions and small-payment functions are matched with environment class "2."

The third environment (environment class "3") is one in which there are 6 or more unregistered proximate mobile phones or 16 or more registered proximate mobile phones. In other words, there is a relatively high number (6 or more) of strangers near the user of mobile phone handset 10 or a relatively large number (16 or more) of acquaintances near the user of mobile phone handset 10. When the user is in such an environment, it may be assumed that the user is in a public space. Therefore, as shown in FIG. 5, ringtone volume adjustment functions for lowering the ringtone volume of mobile phone handset 10 as a matter of public courtesy and silent-mode functions for switching to a silent mode in which the user is notified of received calls through vibrations are matched with environment class "3."

The fourth environment (environment class "4") is one in which there are 1-5 registered proximate mobile phones. In other words, there are only relatively few (1-5) acquaintances near the user of mobile phone handset 10. This type of environment is often encountered during company meetings or when music and other content are being exchanged, for example. Therefore, as shown in FIG. 5, information synchronization functions for exchanging business information and synchronizing information, as well as content exchange functions for exchanging content, are matched with environment class "4."

Finally, the fifth environment (environment class "5") is one in which there is a relatively high number (6-15) of acquaintances near the user of mobile phone handset 10. This type of environment is often encountered when, for example, friends are playing competitive games or a large group is playing a role-playing game. Therefore, as shown in FIG. 5, functions for competitive games and multiplayer games are matched with environment class "5."

The controller 11 judges the environment surrounding the device based on the table of environment definitions 162, specifies the function names to be prioritized and displayed in that surrounding environment, and displays those function names on the display 14. However, the surrounding environment may not always be specified by a single environment, for example, a surrounding the presence and number of proximate mobile phones may simultaneously match multiple environments defined in table of environment definitions 162. In a hypothetical case there may be, for example, three registered proximate mobile phones and one unregistered proximate mobile phones at a location in which mobile phone handset 10 is present. In this case, based on table of environment definitions 162, shown in FIG. 4, the surrounding environment matches both environment class "2" and environment class "4."

In preparation for such cases in which multiple environment classes are simultaneously applicable to a surrounding environment, it may be determined in advance which of the functions matched with each environment class are prioritized and displayed. Specifically, the display control program stored in the memory 16 describes weighting information assigned to each environment class. For example, the environment classes may be ranked as follows in descending order of weighting: environment class 2>environment class 3>environment class 4>environment class 1 (the inequality signs indicate the relative weightings). In this case, when environment class "2" and environment class "4" compete as described above, the environment of environment class "2" is prioritized over the environment of environment class "4". By specifying the order of precedence of different environment class, the display sequence of the function names may be specified according to the order of precedence. In other words, in the table of functions 163, the function names matched with environment class "2" are prioritized and displayed followed by the function names matched with environment class "4," and the remaining functions are displayed in a given sequence or at random. Environments of environment class "0" do not compete with the other environments and are therefore not subject to weighting.

At the manufacturing stage of mobile phone handset 10, several programs are preliminarily written into the ROM of controller 11. These programs will hereinafter be referred to as "preinstalled programs." These preinstalled programs include, for example, multitask operating systems (hereinafter, "multitask OS"), Java (registered trademark) platforms, and native functions. As a general description of these programs, a multitask OS is an operating system that supports various functions for implementing pseudo-parallel execution of multiple tasks in a TSS (Time-Sharing System), such as allocating virtual memory space. A Java platform is a group of programs described according to a CDC (Connected Device Configuration), which is a configuration for implementing Java execution environment 214 (described below) in e.g. a mobile phone handset 10, a mobile device loaded with a multitask OS. A native function is a program that implements basic services of the mobile phone handset 10, such as telephone conversations.

In relation to the ROM configuration described above, the memory 16 has in one embodiment, a Java function storage area that stores Java functions. The Java functions include physical programs describing procedures for processes in Java execution environments, JAR (Java Archive) files combining image files and audio files used when the physical programs are executed, and ADF (Application Descriptor Files) describing the installation and start-up and various attributes of the JAR files. The Java functions are stored in Internet server devices prepared by a content provider or the telecommunications carrier of the mobile phone network 100 and are downloaded from the server devices into the mobile phone handset 10 in response to a request from the mobile phone handset 10.

As shown in FIG. 6, in the mobile phone handset 10, the calling application program 212 and Java execution environment 241 are implemented on the operating system OS 211. The calling application program 212 is a native program preliminarily stored in the memory 16 and implements functions such as accepting and making calls and exchanging audio signals. The java execution environment 214 is implemented by the Java platform stored in the ROM. The java execution environment 214 includes a class library 217, a JVM (Java Virtual Machine) 218, and a JAM (Java Application Manager) 219. The class library 217 combines groups of program modules (classes) with specific functions into a single file. The JVM 218 is a Java execution environment that has been optimized for the CDC described above and includes functions for reading and executing byte codes provided as Java functions. The JVM 218 is also referred to as a CVM (Compact Virtual Machine). JAM 219 includes functions for managing the downloading, installation, and start-up and shutdown of Java functions. The JAM 219 is also referred to as an AMS (Application Management System).

Moreover, the memory 16 is also configured with a first storage 215 and a second storage 216. The first storage 215 is a storage area for Java functions (Jar files and ADF) downloaded under the management of the JAM 219. The second storage 216 is an area for storing data generated when a Java function is executed after the function is shut down, and a separate storage area is allocated for each installed Java function. The data in the storage area allocated to a given Java function is rewritable only when the Java function is being executed, and other Java functions cannot be rewritten at that time.

In one embodiment, the display control program 213 is a program related to displaying the function selection screen described above and is a Java function program implemented in the Java execution environment 214. Application program group 214 includes programs for implementing the various functions described above. Application program group 214 includes the Java function programs implemented in Java execution environment 214 as well as the preinstalled programs stored in the ROM. Examples of the latter preinstalled application programs include programs for implementing E-mail functions, ringtone volume adjustment functions, and silent-mode functions. The multitask OS is configured so that the display control program 213 and the application program group 214 may be executed in parallel.

Figures 7, 8:
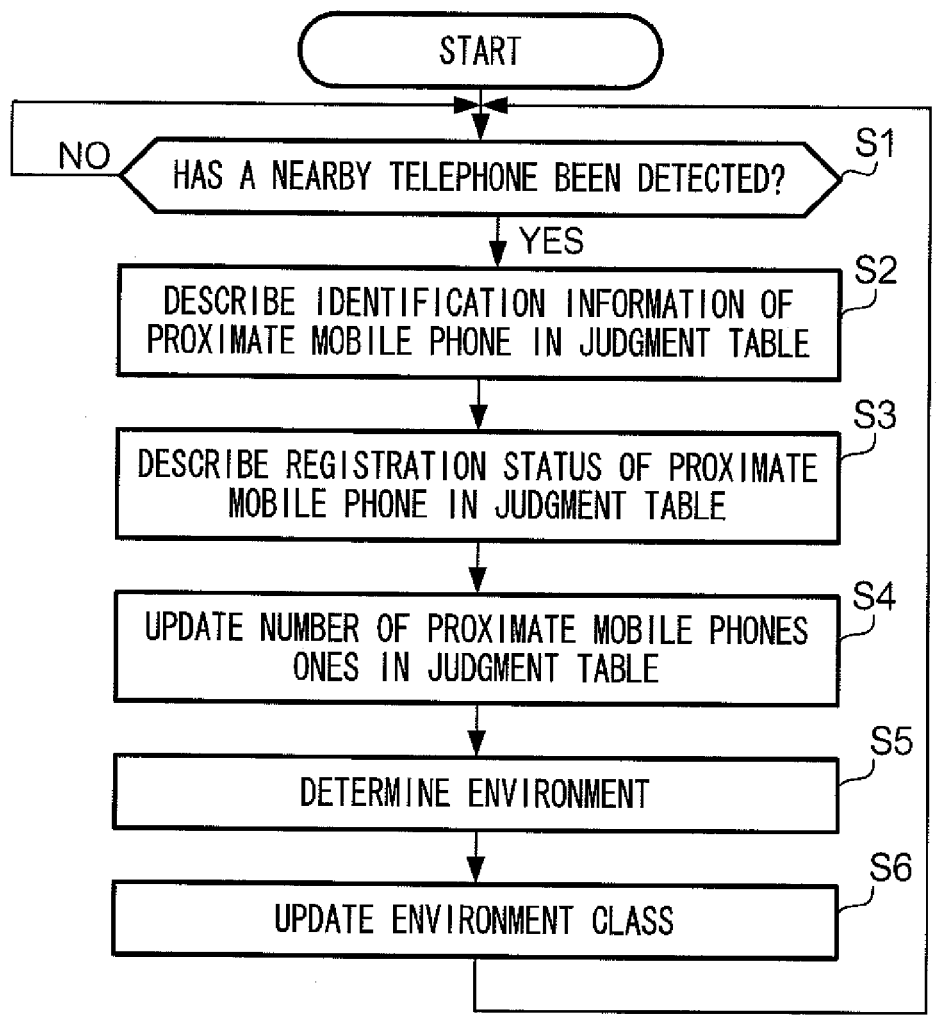
FIG. 7 is a flowchart showing a process executed by the mobile phone handset.
FIG. 8 is a diagram showing one example of the content of a judgment table stored by the mobile phone handset.

One embodiment of a process by which controller 11 judges the surrounding environment will be described with reference to the flowcharts of FIG. 7 and FIG. 10. The short-range wireless communication sections 17 of the mobile phone handsets 10-1, 10-2, 10-3 to 10-n in FIG. 1 regularly transmit polling signals to their respective short-range wireless areas. Each polling signal includes identification information of the mobile phone handset 10 from which it comes. For example, the polling signals transmitted by the short-range wireless communication sections 17 of the mobile phone handsets 10-1 and 10-3 are received by the short-range wireless communication section 17 of the mobile phone handset 10-2. Then, the short-range wireless communication section 17 of the mobile phone handset 10-2 extracts the identification information included in the received polling signals and provides the information to the controller 11. In FIG. 7, once the identification information included in the polling signals is provided from short-range wireless communication section 17, controller 11 determines that proximate mobile phones have been detected (step S1: Yes).

The controller 11 generates a judgment table describing information related to the current environment on the RAM. FIG. 8 is a diagram showing one embodiment of the judgment table. The controller 11 describes the identification information provided from the short-range wireless communication section 17 in the judgment table (step S2), describes the registration status of the proximate mobile phones to which the identification information has been assigned in the judgment table (step S3), and updates the number of proximate mobile phones in the judgment table (step S4). For example, if the controller 11 receives the identification information "5stjiji84554" from a short-range wireless communication section 17, in step S2, it adds a new record in the judgment table and describes the identification information "5stjiji84554" in the record. As shown in FIG. 3, the identification information "5stjiji84554" is identification information that has already been described in the telephone registration table 161. Consequently, in step S3, the controller 11 describes the identification information "5stjiji84554" as "Registered" in the corresponding "Registration status" field. Then, as shown in FIG. 8, because the number of registered proximate mobile phones was "2" in the judgment table before the identification information "5stjiji84554" was described, in step S4, the controller 11 increases the number of registered proximate mobile phones by 1 and updates the number to "3." As a result, the content of the judgment table corresponds to the example shown in FIG. 9.

Returning to FIG. 7, the controller 11 judges the current environment based on the content of the judgment table and the content of the table of environment definitions 162 (step S5). When the content of the judgment table includes 3 registered proximate mobile phones and 1 unregistered proximate mobile phone as shown in FIG. 9, the controller 11 judges that the environment corresponds to environment class "2" and environment class "4" according to the table of environment definitions 162 of FIG. 4. Here, as described above, environment class "2" is prioritized over environment class "4," and therefore, the controller 11 defines the environment of environment class "2" as the highest priority environment and the environment of environment class "4" as the environment to be prioritized next. By thus defining environment class "2" and environment class "4" as the highest priority environment and the environment to be prioritized next, respectively, and storing them in a given area of the RAM, the controller 11 updates the current environment (step S6). Then, the processing performed by the controller 11 returns to step S1.

The above processes of steps S2-S6 are executed each time a proximate mobile phone is detected, and the environment around mobile phone handset 10 is judged each time.

Figures 9, 10:
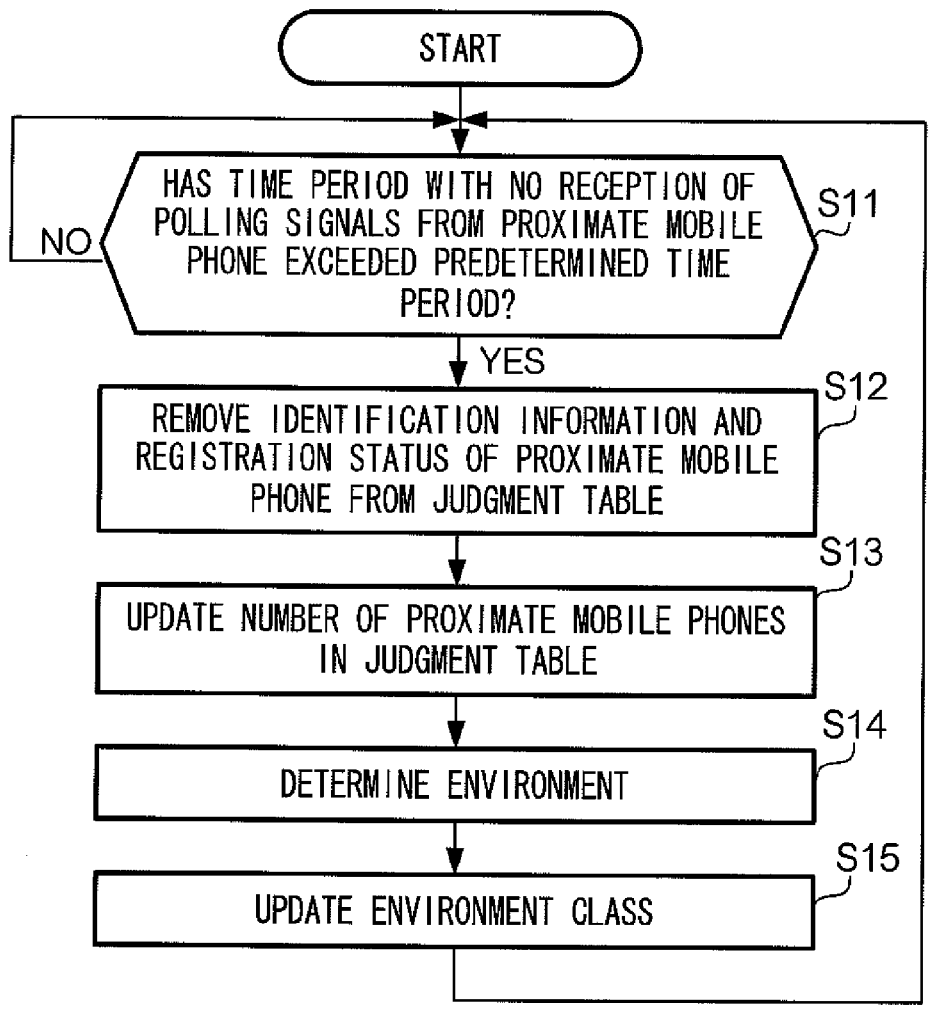
FIG. 9 is a diagram showing one example of the content of a judgment table stored by the mobile phone handset.
FIG. 10 is a flowchart showing a process executed by the mobile phone handset.

FIG. 7 illustrates operations performed in one embodiment when proximate mobile phone enters the short-range wireless area and FIG. 10 is a flowchart showing the processes performed in one embodiment when a proximate mobile phone exits the short-range wireless area.

If, for example, the mobile phone handset 10-1 exits short-range wireless area RA of the mobile phone handset 10-2 in FIG. 1, the short-range wireless communication section 17 of the mobile phone handset 10-2 becomes unable to receive the polling signals that were being regularly received from the mobile phone handset 10-1. When the period of time during which the controller 11 is no longer able to receive the polling signals that were being received from mobile phone handset 10-1 exceeds a predetermined period of time (step S11: Yes), the controller 11 removes the identification information included in the polling signals from the judgment table and also removes the registration status from the judgment table (step S12). Then, the controller 11 updates the number of proximate mobile phones in the judgment table (step S13). In other words, the controller 11 subtracts 1 from the "number of registered proximate mobile phones" or the "number of unregistered proximate mobile phones" in the judgment table exemplified in FIG. 8. Then, based on the content of the judgment table and the content of the table of environment definitions 162, the controller 11 judges the current surrounding environment (step S14). By storing the environment class of the judged environment in a given area on the RAM, controller 11 updates the current environment (step S15). At this time, if multiple environments are competing, an order of preference may be specified according to the weighting of each environment. The processing performed by the controller 11 returns to step S11.

The above processes of step S12-S15 are executed each time a proximate mobile phone exits the short-range wireless area (i.e., each time a proximate mobile phones moves out of range), and the surrounding environment around mobile phone handset 10 is assessed each time.

Figure 11:
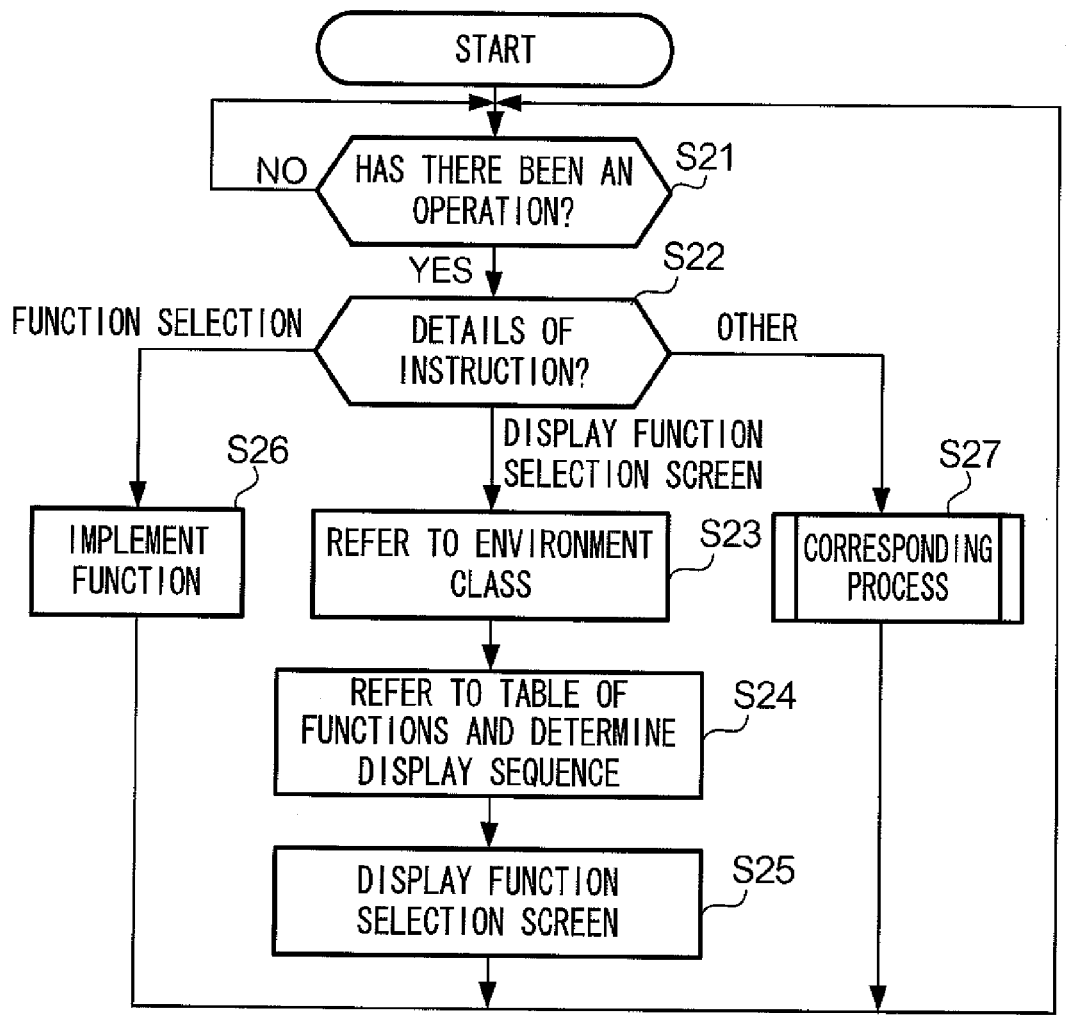
FIG. 11 is a flowchart showing a process executed by the mobile phone handset.

One embodiment of a processes of the controller 11 for displaying a function selection screen and implementing any of the functions is now described with reference to the flowchart of FIG. 11, when the controller 11 detects that the operating section 15 has received some type of operation (step S21: Yes), it determines what type of process has been instructed by the operation (step S22). If the instruction is to display a function selection screen (step S22: display function selection screen), the controller 11 specifies the environment class of the current environment stored in the RAM (step S23). Next, the controller 11 refers to the table of functions 163, specifies the function names corresponding to the specified environment class, and determines the display sequence of the function names (step S24).

Figure 12:
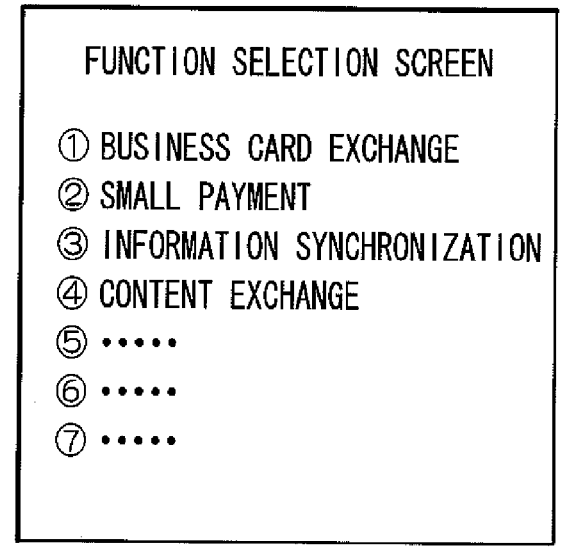
FIG. 12 is a diagram showing one example of a function selection screen displayed by the mobile phone handset.

Then, the controller 11 displays the function selection screen, which lists the function names according to the display sequence (step S25). For example, when environment class "2" and environment class "4" are the highest priority environment and the environment to be prioritized next, respectively, the controller 11 displays a function selection screen similar to the one shown in FIG. 12. When the user selects a desired function name, controller 11 accepts the operation (step S21: Yes). Then, when the controller 11 determines that a certain function name has been selected by the operation (step S22: function selection), it executes an application program to implement the function and implements the selected function (step S26). In step S22, if it is determined that the operation provides an instruction for a different process (step S22: other), the controller 11 executes a corresponding process (step S27).

According to the exemplary embodiment described above, the environment around a mobile phone handset is judged according to a number of proximate mobile phones and the registration status of those proximate mobile phones, and the display sequence of the function names on the function selection screen is changed according to the environment. As a result, by determining the environment of other mobile phones in the vicinity of the first mobile phone handset, functions that are highly likely to be selected by the user may be displayed at a position requiring fewer operations for selection. Consequently, the number of operations required of a user for selecting any of multiple functions may be reduced.

The above-described embodiment pertained to using a mobile phone handset with calling functions as a mobile terminal. However, the present invention is not limited to in this regard, and in other embodiments, the invention may be implemented using a mobile terminal without calling functions, such as a PDA (Personal Digital Assistant) or mobile computer with functions for wireless data communication.

While the particular details of the algorithm for judging the environment were disclosed in relation to the above-described embodiments, the invention is not limited in this regard, and in other embodiments, the content of the table of environment definitions 162 or the table of functions 163 may be different from the content shown in FIGS. 4 and 5. For example, for the table of environment definitions 162, which is shown in FIG. 4, the number of proximate mobile phones has been described as an example of criterion for judging the environment, but this number may be changed or adjusted to an appropriate value corresponding to the lifestyles or lifestyle patterns of individual users or their patterns of use of functions. For example, the user may use the operating section 15 to set the number of proximate mobile phones corresponding to each environment class to any appropriate number.

Moreover, for the table of functions 163, which is shown in FIG. 5, the function names have been matched with the environment classes, but these matching relationships may be set by the user using the operating section 15. For example, if the user refers to a function selection screen on which function names have been arranged in a given sequence and performs operations to change the display positions (display sequence), the controller 11, which should already have judged the surrounding environment at that point in time, matches the environment class of the environment with the function names provided with a higher priority in the display sequence by the user and describes them in the table of functions 163. Subsequently, the controller 11 determines the display sequence of the function names according to the content of the table of functions 163 and displays a function selection screen on which the function names have been arranged according to the display sequence. In this way, the mobile phone handset 10 learns the appropriate relationships of correspondence between the functions and the environments based on the history of changes made to the display positions by the user.

Moreover, in preparation for situations in which multiple environments compete to be defined as the surrounding environment, weighting information of each of the environments is described in the display control program. The weighting for each environment may also be configured or changed by the user, from what has previously been described using operating section 15, for example.

Moreover, the content to be written into the table of environment definitions 162 or the table of functions 163 may be described in an application program describing procedures for the controller 11 to implement a function. This is particularly useful when downloading a new application program onto the mobile phone handset 10 through a network or installing an application program read out from a storage medium onto the mobile phone handset. For example, two users may exchange data between their respective mobile phone handsets using a short-range wireless function to play a tennis game. In a given area of the application program for implementing the tennis game function, the status of proximate mobile phones is described as "1 registered nearby telephone" and the application name is described as "Tennis game." The controller 11 of the mobile phone handset 10 uses the wireless communication section 12 to download (obtain) the application program and stores it in memory 16. Next, the controller 11 reads out the status of proximate mobile phones of "1 registered nearby telephone" from the given area of the application program and writes this into a new record on table of environment definitions 162. Then, the controller 11 issues a new environment class "6", matches environment class "6" with the status of proximate mobile phones of "1 registered nearby telephone," and writes this into table of environment definitions 162. Furthermore, the controller 11 creates a new record in the table of functions 163, writes "Tennis game" as a function name, and writes "6" as the corresponding environment class. Once table of environment definitions 162 and table of functions 163 have been updated in this manner, the controller 11 may continue operating as described in the above exemplary embodiment.

Moreover, the given area of the application program may describe only the environment class and the application name. In this case, the environment class described in the application program is one of "1" to "5" described in the table of environment definitions 162 of the mobile phone handset 10. The controller 11 of mobile phone handset 10, after obtaining the application program and storing it in the memory 16, may then create a new record in the column for the environment class on the table of functions 163 and write the application name as the function name.

In this way, the content of the table of environment definitions 162 or table of functions 163 may be updated according to the intentions of the provider of the application program. When function identification information assigned to a function is transmitted from a proximate mobile phone detected by the mobile phone handset 10, the mobile phone handset may receive the function identification information and set a display sequence in which the function name to which the received function identification information has been assigned is arranged at a position requiring fewer operations of the user for selecting the function.

For example, exchanging business cards, when five users enter a single room, and wish to exchange business cards, their respective mobile phone handsets 10 each detect one another as proximate mobile phones. Then, for example, two of the five users operate their own mobile phone handsets 10 to display the function selection screen and select a business-card-exchange function on the screen. At this time, the controller 11 of the mobile phone handsets 10 of these two users transmits function identification information assigned to the business-card-exchange function using the short-range wireless communication section 17 in each phone. As a result, short-range wireless communication section 17 of mobile phone handsets 10 of the remaining three users receives the function identification information assigned to the business-card-exchange function from the first two mobile phone handsets. The controller 11 of the three mobile phone handsets 10, upon receiving identical function identification information from two or more nearby telephones, determines a display sequence in which the business-card-exchange function name to which the received function identification information is assigned is arranged at a position requiring fewer operations of the user for selecting the function compared to other function names. Then, the controller 11 displays the function names using the display sequence.

In this example, "2 handsets" was set as the threshold value, wherein identical function identification information was received from proximate mobile phones of the threshold value or more, but in other embodiments, a different threshold value may be used. Optionally, a different threshold value may be determined for each function.

In this way, the mobile phone handset 10 may arrange the function name specified by function identification information transmitted from mobile phone handsets present within a given distance at a position requiring fewer operations of the user for selecting the function When a single mobile phone handset 10 is shared by multiple users, it may be preferable for the telephone registration table 161, the table of environment definitions 162, the table of functions 163, and the weighting information for each environment to be set differently for each user. This is because each user has different interpersonal relationships and lifestyles and uses the mobile phone handset 10 differently. In this case, the memory 16 stores a telephone registration table 161, a table of environment definitions 162, and a table of functions 163 for each user. Moreover, weighting information for each environment is also stored in the memory 16 for each user. The mobile phone handset 10 includes a user identification unit that identifies the user of the handset through, for example, password verification or fingerprint authentication. The controller 11 identifies the user through the user specification unit and uses telephone registration 161, the table of environment definitions 162, the table of functions 163, and the weighting information for each environment corresponding to the user to perform operations similar to those of the exemplary embodiment.

The judgment criteria for the environment surrounding the user may also change depending on the region (area) the user is in. For example, when the user is in a specified area, such as the office or at home, even if there are a high number of unregistered proximate mobile phones, it may not be necessary to define the environment as a public space (environment class 2). On the other hand, when the user is in an unspecified area outside the office or home, even if there is only 1 unregistered proximate mobile phone, the user may be in a public space. In other words, the content of the table of environment definitions 162 and the table of functions 163 may be changed according to the area that the mobile phone handset 10 is in.

Specifically, in addition to including a positioning unit using GPS (Global Positioning System) technology or the like in the mobile phone handset 10, position information of specified areas, such as the office and home, is stored in the memory 16. When the user issues an instruction to display the function selection screen, the controller 11 compares the position read by the positioning unit and the positions stored in the memory 16 and judges whether the mobile phone handset 10 (i.e., the user) is in a specified area, such as the office or home, or in an unspecified area. If the user is in a specified area, such as the office or home, the controller 11 may determine the display sequence of the function names on the function selection screen based on the content of the table of environment definitions 162 and the table of functions 163 that have been prepared for each area. On the other hand, if the user is in an unspecified area, the controller 11 may determine the display sequence of the function names on the function selection screen based on the content of the table of environment definitions 162 and the table of functions 163 prepared for the unspecified area.

While the unit for detecting proximate mobile phones has been described as using short-range wireless communication, this is not a limitation on the invention, and in other embodiments, a positioning unit using GPS technology may read the position of each mobile phone handset 10 and detect the presence of proximate mobile phones based on the positional relationships. Alternatively, various sensors, such as magnetic sensors, optical sensors, infrared sensors, and temperature sensors, may be used to detect proximate mobile phones (or the users carrying a proximate mobile phone).

The display control program executed by the controller 11 may be stored and provided on a recording medium, such as a magnetic tape, a magnetic disk, a flexible disk, an optical recording medium, a magneto-optical medium, a CD (Compact Disk), a DVD (Digital Versatile Disk), or a RAM. Moreover, it may also be downloaded onto mobile phone handset 10 through a network, such as a mobile phone network or the Internet.

What is claimed is:

1. A mobile terminal being a first mobile terminal and comprising:
    a display control unit that displays, on a display, a function selection screen on which a plurality of function names are arranged in accordance with a given sequence;
    a selection operation unit that accepts an operation for selecting any of the function names arranged on the function selection screen;
    an implementation unit that implements the function with the name selected through the operation accepted by the selection operation unit;
    a detection unit that detects another mobile terminal present within a given distance from a position of the first mobile terminal; and
    a determination unit that determines an environment class of the mobile terminal according to a detection result of the detection unit, the determined environment class is selected from a plurality of environment classes defined in advance, the determination unit further determines an arrangement of function names in a sequence for display, wherein a function name corresponding to the determined environment class is arranged at a first position in the sequence and is selectable by fewer selection steps than required for selection of function names not at the first position in the sequence,
    wherein the plurality of environment classes are classes to which environments are assigned, an environment based on a number of other mobile terminals present within the given distance from the position of the first mobile terminal.

2. The mobile terminal according to claim 1, wherein:
    the detection unit determines the number of other mobile terminals present within the given distance from the position of the first mobile terminal; and
    the determination unit determines the arrangement of function names in a sequence depending on the number of other mobile terminals determined by the detection unit.

3. The mobile terminal according to claim 1, further comprising an identification information memory that stores identification information assigned to the detected other mobile terminal, wherein:
    the detection unit determines the identification information assigned to the detected other mobile terminals present within the given distance from the position of the first mobile terminal; and
    the determination unit determines the arrangement of the sequence differently for a case in which the identification information determined by the detection unit matches the information stored in the identification information memory, and a case in which the identification information determined by the detection unit does not match the information stored in the identification information memory.

4. The mobile terminal according to claim 1, wherein:
    the determination unit further comprises:
    an environment definition memory that stores information detected by the detection unit and the environment assigned to each of a plurality of environment classes defined in advance as environments of the first mobile terminal;
    a function memory that stores function identification information assigned to each of the functions and the environment classes;
    an environment specification unit that specifies the environment class that is associated with the information detected by the detection unit and stored in the environment definition memory; and
    a function specification unit that specifies function identification information that is associated with the environment class specified by the environment specification unit and stored in the function memory, and
    determines the sequence to arrange the function name assigned to the function identification information specified by the function specification unit at a position where the function name is selectable by use of fewer operation selection steps than are required to be used for selection of other of the function names.

5. The mobile terminal according to claim 4, wherein, if the environment specification unit specifies a plurality of environment classes, the determination unit specifies an order of precedence for each of the plurality of environment classes according to a weighting assigned to each of the plurality of environment classes, and determines the sequence according to the specified order of precedence.

6. The mobile terminal according to claim 1, further comprising:
    a modification operation unit that accepts operations for modifying the sequence determined by the determination unit; and
    a modified-content memory that stores content modified through the operations accepted by the modification operation unit, wherein the determination unit determines the arrangement of the function names in the sequence according to the content stored in the modified-content memory.

7. The mobile terminal according to claim 4, further comprising:
   an acquisition unit that acquires a program describing steps for implementing the function using the implementation unit along with the content stored in the environment definition memory or the function memory; and
   an update unit that updates the content stored in the environment definition memory or the function memory according to the content described in the program acquired by the acquisition unit.

8. The mobile terminal according to claim 1, further comprising a reception unit that, when function identification information assigned to the function is transmitted from another mobile terminal detected by the detection unit, receives the function identification information, wherein
   the determination unit determines the arrangement of the function names in the sequence and the function identification information received by the reception unit is assigned a first position in the sequence and-is selectable by fewer selection steps than required for selection of function names not at the first position in the sequence.

9. The mobile terminal according to claim 1, further comprising a user identification unit that identifies a user using the mobile terminal, wherein
   the determination unit determines the arrangement of the function names in the sequence for the user identified by the user identification unit.

10. The mobile terminal according to claim 1, further comprising an area specification unit that specifies an area in which the first mobile terminal is located, wherein
   the determination unit determines the arrangement of the function names in the sequence for each area specified by the area specification unit.

11. A non-transitory electronic storage medium containing a program to cause a computer to operate:
   a display control unit that displays a function selection screen on which a plurality of function names are arranged in accordance with a given sequence, and that is used to select any of a plurality of function names;
   a detection unit that detects another mobile terminal present within a given distance from the position of the computer; and
   a determination unit that determines an environment class of the mobile terminal according to a detection result of the detection unit, the determined environment class is selected from a plurality of environment classes defined in advance, the determination unit further determines an arrangement of function names in a sequence for display, wherein a function name corresponding to the determined environment class is arranged at a first position in the sequence and is selectable by fewer selection steps than required for selection of function names not at the first position in the sequence,
   wherein the plurality of environment classes are classes to which environments are assigned, an environment based on a number of other mobile terminals present within the given distance from the position of the first mobile terminal.

12. The mobile terminal according to claim 1, wherein the function name corresponding to the determined environment class is arranged at an uppermost position of a list, and another function name is arranged at a position lower than the uppermost position of the list.

13. The non-transitory electronic storage medium according to claim 11, wherein the function name corresponding to the determined environment class is arranged at an uppermost position of a list, and another function name is arranged at a position lower than the uppermost position of the list.

* * * * *